US009681017B2

(12) United States Patent
Aarnio

(10) Patent No.: US 9,681,017 B2
(45) Date of Patent: Jun. 13, 2017

(54) ARRANGEMENT FOR IMAGE PROCESSING

(71) Applicant: Nokia Technologies Oy, Espoo (FI)

(72) Inventor: Tomi Aarnio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 78 days.

(21) Appl. No.: 14/646,638

(22) PCT Filed: Nov. 26, 2012

(86) PCT No.: PCT/FI2012/051165
§ 371 (c)(1),
(2) Date: May 21, 2015

(87) PCT Pub. No.: WO2014/080068
PCT Pub. Date: May 30, 2014

(65) Prior Publication Data
US 2015/0281506 A1    Oct. 1, 2015

(51) Int. Cl.
*G06K 9/32* (2006.01)
*H04N 1/21* (2006.01)
*G06T 1/60* (2006.01)
*G06T 3/40* (2006.01)
*H04N 5/91* (2006.01)

(52) U.S. Cl.
CPC ............. *H04N 1/2104* (2013.01); *G06T 1/60* (2013.01); *G06T 3/4015* (2013.01); *H04N 5/91* (2013.01); *H04N 2201/0012* (2013.01)

(58) Field of Classification Search
CPC ....... G06T 1/60; G06T 3/4015; H04N 1/2104; H04N 2201/0012; H04N 5/91
See application file for complete search history.

(56) References Cited

U.S. PATENT DOCUMENTS

| | | | | |
|---|---|---|---|---|
| 6,236,433 B1* | 5/2001 | Acharya | ............... | G06T 3/4007 348/273 |
| 2004/0201721 A1* | 10/2004 | Baharav | ............... | G06T 3/4015 348/222.1 |
| 2005/0231607 A1 | 10/2005 | Kwon et al. | | |
| 2007/0230827 A1* | 10/2007 | Haukijarvi | ............ | G06T 3/4007 382/298 |
| 2009/0046170 A1 | 2/2009 | Linzer | | |
| 2010/0067789 A1 | 3/2010 | Cai et al. | | |
| 2011/0273593 A1 | 11/2011 | Cohen et al. | | |
| 2013/0229531 A1* | 9/2013 | Zhang | .................. | H04N 17/002 348/187 |

OTHER PUBLICATIONS

International Search Report and Written Opinion received for corresponding Patent Cooperation Treaty Application No. PCT/FI2012/051165, dated Nov. 13, 2013, 11 pages.

* cited by examiner

*Primary Examiner* — Phuoc Tran
(74) *Attorney, Agent, or Firm* — Nokia Technologies Oy

(57) ABSTRACT

A method and an apparatus arranged to obtain raw image data acquired by an image sensor to be applied in an image processing algorithm; adjust, in the processor miming the image processing algorithm, logical dimensions of the image such that logical width of the image is doubled and logical height of the image is halved; adjust the image processing algorithm to take into account the adjusted logical dimensions of the image; and apply the image processing algorithm with the adjusted logical dimensions of the image.

18 Claims, 4 Drawing Sheets

ARRANGEMENT FOR IMAGE PROCESSING

RELATED APPLICATION

This application was originally filed as Patent Cooperation Treaty Application No. PCT/FI2012/051165 filed Nov. 26, 2012.

FIELD OF THE INVENTION

The present invention relates to image processing, and more particularly to processing raw color samples.

BACKGROUND

The raw color samples produced by a digital camera sensor are typically arranged into a so-called Bayer pattern. In the Bayer pattern, red, green, and blue samples are organized such that each 2×2 pixel tile contains two samples of green (G), one of red (R), and one of blue (B), where the green samples locate diagonally to each other in the 2×2 pixel tile.

The Bayer pattern has proven to be efficient for image acquisition, but rather inefficient for processing image data, particularly on a GPU (Graphics Processing Unit). This is because consecutive samples of the same color are not adjacent to each other in the vertical and horizontal directions.

On a typical GPU, accessing any one pixel of an image will cause an entire M×N pixel region to be fetched into the texture cache. If an arbitrary image processing algorithm needs to access samples of a certain color only, for example red (R) samples only, also the irrelevant two green (G) samples and the blue (B) sample would be stored in the cache along with each red sample. In other words, 75% of the expensive texture cache and memory bus bandwidth would be wasted. Thus, there is a need for a more efficient method for processing raw color samples.

SUMMARY

Now there has been invented an improved method and technical equipment implementing the method, by which the above problems are at least alleviated. Various aspects of the invention include a method, an apparatus and a computer program, which are characterized by what is stated in the independent claims. Various embodiments of the invention are disclosed in the dependent claims.

According to a first aspect, a method according to the invention is based on the idea of obtaining raw image data acquired by an image sensor to be applied in an image processing algorithm; adjusting, in a processor running the image processing algorithm, logical dimensions of the image such that logical width of the image is doubled and logical height of the image is halved; adjusting the image processing algorithm to take into account the adjusted logical dimensions of the image; and applying the image processing algorithm with the adjusted logical dimensions of the image.

According to an embodiment, the method further comprises: adjusting the logical dimensions of the image by instructing the processor to interpret the logical width of the image as doubled and the logical height of the image as halved, while the size of the image in a memory remains unchanged.

According to an embodiment, the method further comprises: instructing the processor to said interpretation by calling one or more functions in an API used to control the processor.

According to an embodiment, the API is one of the following: OpenGL, OpenGL ES, OpenCL, Direct3D, DirectCompute, WebGL, WebCL, or some of their extensions.

According to an embodiment, the raw image data comprises green, red and blue samples arranged in a Bayer pattern.

According to an embodiment, the raw image data comprises color samples arranged in a RGBE pattern, a RGBW pattern, a CYYM pattern or a CYGM pattern.

According to an embodiment, one or more of the filters in the pattern is replaced by a filter arranged to pass light at least in non-visible light spectrum.

According to an embodiment, the image processing algorithm is a Block Matching 3D (BM3D) denoising algorithm.

According to an embodiment, the processor is a graphics processing unit (GPU) arranged to obtain the raw image data acquired by the image sensor.

According to a second aspect, there is provided an apparatus comprising at least one processor, memory including computer program code, the memory and the computer program code configured to, with the at least one processor, cause the apparatus to at least: obtain raw image data acquired by an image sensor to be applied in an image processing algorithm; adjust, in a processor running the image processing algorithm, logical dimensions of the image such that logical width of the image is doubled and logical height of the image is halved; adjust the image processing algorithm to take into account the adjusted logical dimensions of the image; and apply the image processing algorithm with the adjusted logical dimensions of the image.

According to a third aspect, there is provided a computer readable storage medium stored with code thereon for use by an apparatus, which when executed by a processor, causes the apparatus to perform: obtaining raw image data acquired by an image sensor to be applied in an image processing algorithm; adjusting, in a processor running the image processing algorithm, logical dimensions of the image such that logical width of the image is doubled and logical height of the image is halved; adjusting the image processing algorithm to take into account the adjusted logical dimensions of the image; and applying the image processing algorithm with the adjusted logical dimensions of the image.

According to a fourth aspect, there is provided an apparatus comprising: means for obtaining raw image data acquired by an image sensor to be applied in an image processing algorithm; means for adjusting, in the processor running the image processing algorithm, logical dimensions of the image such that logical width of the image is doubled and logical height of the image is halved; means for adjusting the image processing algorithm to take into account the adjusted logical dimensions of the image; and means for applying the image processing algorithm with the adjusted logical dimensions of the image.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a simplified example of a camera system suitable to be used in the embodiments;

DESCRIPTION OF EMBODIMENTS

Figure 1:
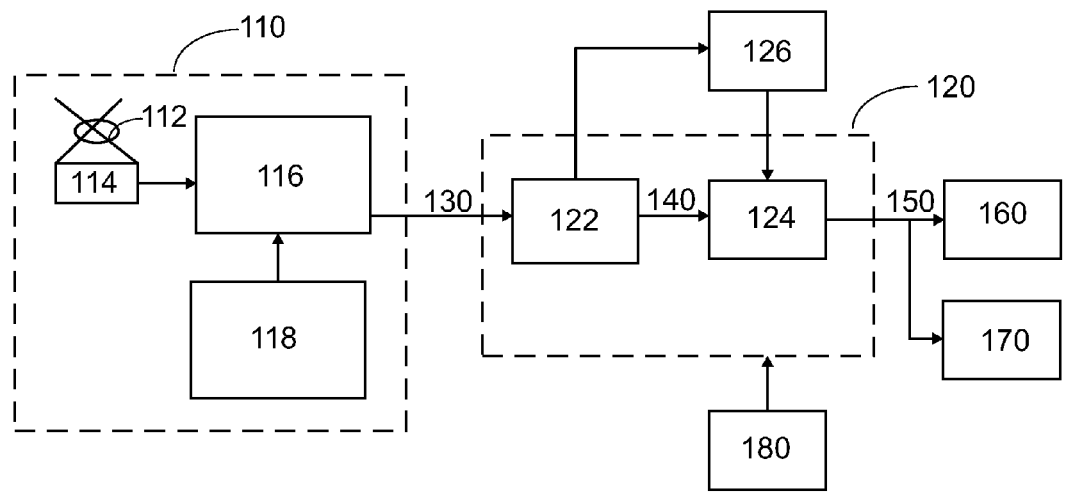

FIG. 1 illustrates a simplified example of a camera system suitable to be used in the embodiments. As shown in FIG. 1, the camera system 100 comprises a camera module 110 and an image signal processing module 120 adapted to receive raw image data 130 from an image data storage 116 in the camera module 110 or a separate data storage 118. The camera module 110 may be a digital camera with an imaging lens 112 for forming an image on an image sensor 114. The raw image data 130 is processed in the image signal processing module 120, where the processing may at its simplest include, for example, white balancing 122 to produce white-balance processed data 140. The white-balance processed data 140 may be directly provided to a color correction module 124 for color adjustment, or it can be stored in a data storage 126 enabling the color correction to be performed later and/or in a separate color correction module. The output of the color correction module 124 is the color-corrected image data 150 which can be stored in a data storage 160 and provided to a display 170 so as to allow a user to see an image of a scene before and after image capturing. The camera system 100 may include a user interface 180 to allow the user to partially control the image processing processes. For example, a user may change the color of a picture as if the picture is taken under a different lighting condition.

The camera system may be included in any kind of data processing device, such as still image cameras as well as video cameras and other encoders, mobile phones and smart phones, Internet access devices, for example Internet tablet computers, and personal computers of various sizes and formats. The functions of the image signal processing module 120 may be distributed among a central processing unit CPU of the data processing device and a graphics processing unit GPU of the data processing device.

Along with the increase in the quality of displays and display drivers as well as in the processing power of graphics processing units used in data processing devices, the demand for even better image quality in computer graphics also continues. For example, various three-dimensional (3D) effects, such as applying textures on the surfaces of 3D objects in order to render a 3D scene to have a more realistic look, are used in various graphic applications in data processing devices. Such 3D effects are typically computationally demanding tasks, and usually a separate graphics processing unit (GPU) is used for carrying out the heavy computing.

Figure 2:
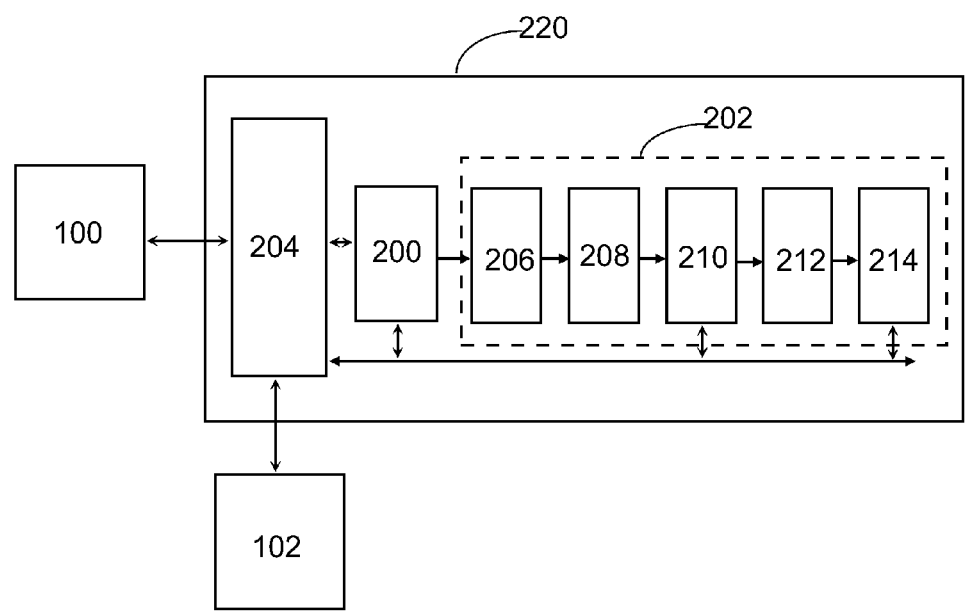
FIG. 2 shows an example of a GPU suitable to be used in the embodiments.

FIG. 2 illustrates an example of a GPU 220 suitable to be used in the embodiments. The GPU may include, among other things, a command processor 200 and a graphics pipeline 202. The central processing unit CPU 100 communicates streams of data (e.g., graphics command streams and display lists) to the command processor 200 via a processor interface 204. The processor interface 204 is implemented according to a platform-specific application programming interface API, and depending on the platform, the API of choice may be OpenGL (Open Graphics Library), OpenGL ES (Embedded Systems), OpenCL (Open Computing Language), Direct3D, DirectCompute, WebGL, WebCL, some of their extensions, or any other interface that allows programmatic access to the GPU.

The command processor 200 converts command processing operations into format supported by the graphics pipeline, and passes the resulting data to the graphics pipeline 202 for 2D and/or 3D processing and rendering. The graphics pipeline 202 then generates images based on these commands. The graphics pipeline 202 comprises various processing units operating parallel in order to achieve high efficiency, and these units may include, for example, a transform unit 206, a setup/rasterizer 208, a texture unit 210, a texture environment unit 212, and a pixel engine 214.

A skilled man appreciates that the above-described structure for the functions of the image signal processing module is only one example of a platform, wherein the embodiments described below can executed. The functions of the image signal processing module can be implemented in various ways, and a separate GPU, as described in FIG. 2, is not necessarily needed, even though in most cases it provides significant advantages in fostering the computation of 3D effects remarkably.

The image sensor of the camera system may be, for example, a CCD sensor or a CMOS sensor. In either case, the pixels of the image sensor are typically provided with a color filter array called a Bayer array. The Bayer array consists of alternating rows of red (R) filters and green (G) filters and, on the next row, green (G) filters and blue (B) filters. Therefore, the filter pattern is also called RGBG. Often the green filters on the alternating rows are distinguished from each other by referring to G1 and G2, or to G and g. In other words, the Bayer array contains twice as many green as red or blue filters, which is due to the human vision system being more sensitive to green light than both red and blue light.

Figure 3:
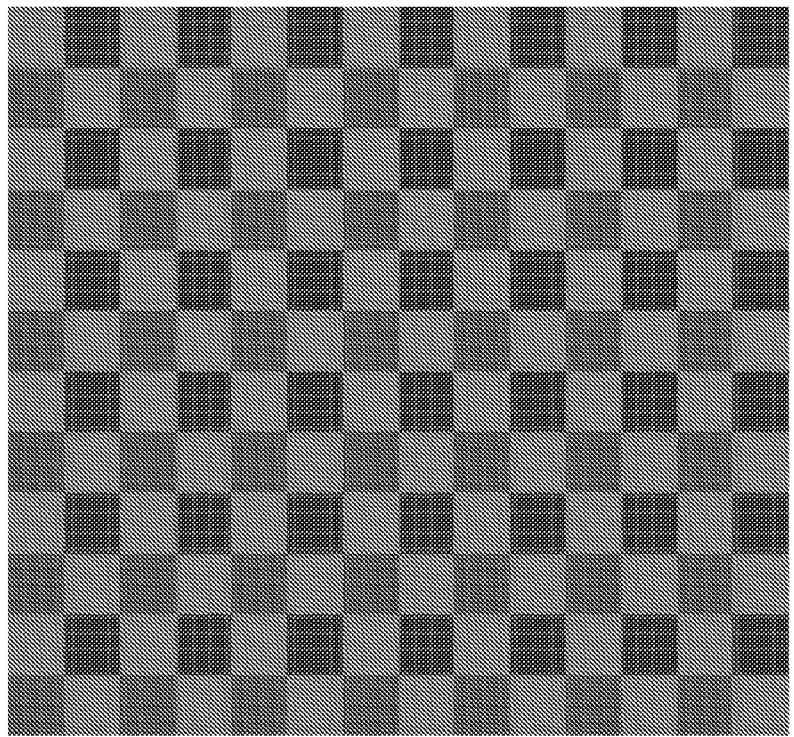
FIG. 3 illustrates a Bayer pattern image.

The raw output of Bayer-filter image sensors is referred to as a Bayer pattern image, which is shown in FIG. 3. Since each pixel is filtered to record only one of three primary colors, the data from each pixel cannot fully determine color on its own. Bayer demosaicing is a process of interpolating the Bayer pattern image of primary colors into a final full-color image. In the most typical demosaicing algorithm, each 2×2 pixel tile of red (R), green (G1 or G), green (G2 or g) and blue (B) is interpreted as a single full color cavity, which as appropriately interpolated provides a full-color image for the area represented by the 2×2 pixel tile.

The Bayer pattern is proven to be efficient for image acquisition, but less than ideal for efficient raw sample processing, particularly on a GPU. This is because consecutive samples of the same color are not adjacent to each other in the vertical and horizontal directions.

To illustrate, an image of 8×4 samples could be laid out as follows:

TABLE 1

| R | G | R | G | R | G | R | G |
|---|---|---|---|---|---|---|---|
| g | B | g | B | g | B | g | B |

TABLE 1-continued

| R | G | R | G | R | G | R | G |
|---|---|---|---|---|---|---|---|
| g | B | g | B | g | B | g | B |

On a typical GPU, accessing any one pixel of an image will cause an entire M×N pixel region to be fetched into the texture cache. For example, if an image processing algorithm needs to access the G samples only, the majority (i.e. 75%) of the texture cache is nevertheless filled with irrelevant g, R, and B samples.

Figure 4:
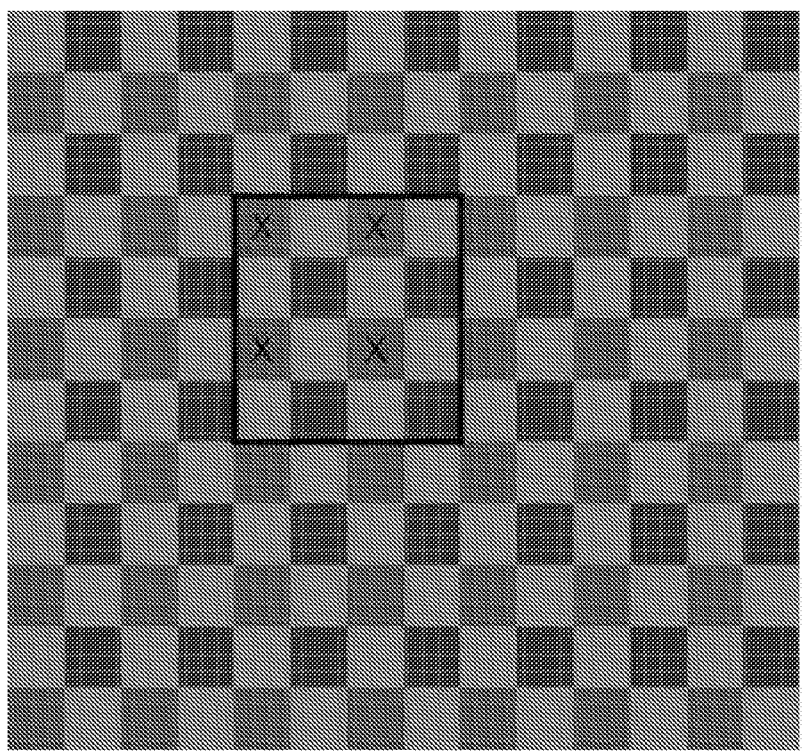
FIG. 4 illustrates a conventional method for accessing pixels in a Bayer pattern image.

Another example of the problem is illustrated in FIG. 4, where an image processing algorithm arranged to access the four red pixels marked by 'X' causes the GPU to fetch the green pixels left and down to each red pixel and the blue pixel diagonally down-left to each red pixel. Thus, pixels from the whole area marked with the black rectangle, altogether 16 pixels, in FIG. 4 are fetched into the texture cache. Again, a large number of irrelevant green and blue pixels unnecessarily consume memory bus bandwidth and texture cache.

In addition to the Bayer array, there exist a number of other color filter arrays confronting the same problem of inefficient pixel access. These color filter arrays include, for example, a RGBE filter pattern, where alternate ones of the green filters are modified to a color of emerald, and a RGBW filter pattern, where alternate ones of the green filters are modified to white. For the RGBW filter pattern, there is a plurality of variation depending on how a 2×2 pixel tile of red, green, blue and white filters are arranged in relation to each other.

If a CMYK color model is used, the color filter arrays include, for example, a CYYM filter pattern, where a cyan filter, two yellow filters and a magenta filter are used similarly to Bayer pattern. Another color filter array for the CMYK color model is a CYGM filter pattern, where a cyan, a yellow, a green and a magenta filter are used similarly to a RGBW pattern.

Furthermore, in addition to using color filters and image sensors capable of capturing visible light, it is also possible to use a filter pattern where one or more of the filters in the filter array are arranged to pass light in the non-visible light spectrum. For example, in addition to filters passing visible light, such as R, G and B filters, the fourth filter in the array may be configured to pass light in the infrared (IR) light spectrum, possibly limited to just the near infrared (NIR) spectrum if desired, or alternately light in the ultra-violet (UV) light spectrum.

It is further possible that one or more of the filters in the filter array are arranged to pass light in both visible light spectrum and the non-visible light spectrum. For example, it is known to use a filter array comprising R, G and B filters, wherein the fourth filter in the array is a grey (Gr) filter arranged to pass both visible light and non-visible light in the near infrared (NIR) spectrum. The use of such RGBGr filter pattern may improve the performance of the image sensor at least in low light conditions.

Now an embodiment relating to a method for accessing pixels of an image is presented, wherein the processor's (such as the GPU's) interpretation of the dimensions of the image is changed such that the processor interprets the image to be twice as wide and half the height of the actual size of the image. In other words, the configuration of the samples of the image in the memory is not changed, only the processor is instructed to interpret the dimensions of the image differently.

Figure 5:
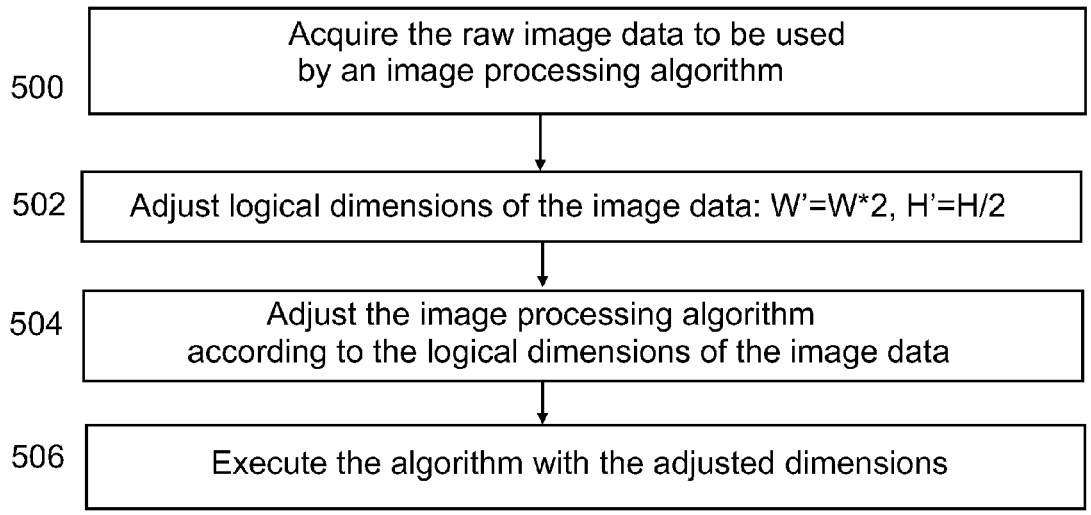
FIG. 5 illustrates a method according to an embodiment of the invention.

An example of a method according to an embodiment is illustrated in FIG. 5. In the example, an arbitrary image processing algorithm is to be applied to pixel data obtained from an image sensor arranged in the Bayer pattern or in a corresponding filter array pattern. First, the raw image data is acquired (500) from the image sensor. The dimensions of the image are H×W (height×width). In the processor running the image processing algorithm, the logical dimensions of the image are adjusted (502) such that the logical width of the image is doubled and the logical height of the image is halved; the logical width W' is W*2 and the logical height H' is H/2. In practice, this can be achieved by calling the appropriate functions in whichever API is used to control the processor. The actual image processing algorithm is also adjusted (504) to take into account the new width W*2 and height H/2. For example, a pixel that used to be at location (x, y) in the original image will now be at location (x+W, y/2), where W=width*(y %2), where % is the modulo operator. In other words, W=0 on even-numbered rows, and W=width on odd-numbered rows. A skilled person appreciates that adjusting the actual image processing algorithm may be performed in forehand; i.e. before either of the steps 500 or 502. Finally, the image processing algorithm may be executed (506) with the adjusted width and height values.

The effect achieved through the procedure can be illustrated on the basis of the exemplified image in Table 1. By instructing the processor to interpret the image twice as wide as it really is, the processor will interpret an 8×4 pixel image as a 16×2 pixel image with the following layout of R, G, g, and B samples:

TABLE 2

| R | G | R | G | R | G | R | G | g | B | g | B | g | B | g | B |
|---|---|---|---|---|---|---|---|---|---|---|---|---|---|---|---|
| R | G | R | G | R | G | R | G | g | B | g | B | g | B | g | B |

Figure 6:
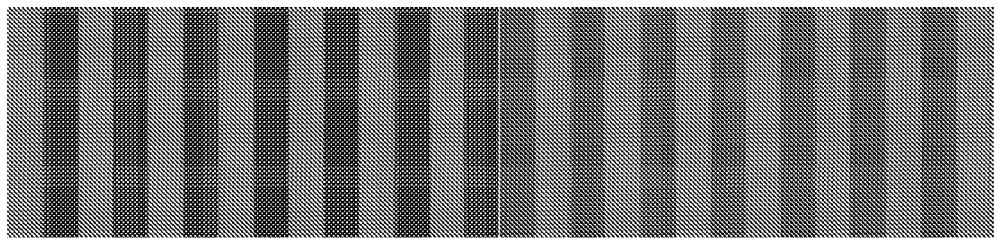
FIG. 6 shows the Bayer pattern image of FIG. 3 in an adjusted form according to an embodiment of the invention.

The effect is further illustrated in FIG. 6 showing the Bayer pattern image of FIG. 3 in the adjusted form as interpreted by a processor. As can be seen in both Table 2 and FIG. 6, pixels of the same color are closer to each other in 2D space. Nevertheless, the actual location of the pixels of the raw image data in the image data storage remains unchanged.

Figure 7:
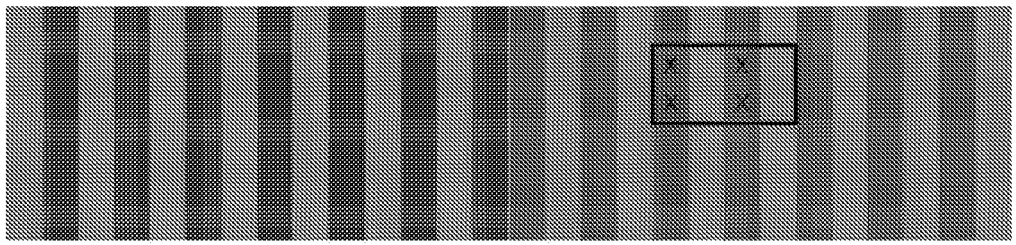
FIG. 7 illustrates a method for accessing pixels in a Bayer pattern image according to an embodiment of the invention.

The advantages obtained through the process are illustrated in FIG. 7, where the four red pixels of FIG. 4 are now arranged in the adjusted form as interpreted by a processor. Now the image processing algorithm arranged to access the four red pixels marked by 'X' causes the processor to fetch the green pixels left to each red pixel. Instead of 16 pixel as in the case of FIG. 3, now only 8 pixels needs to be accessed to obtain the four red pixels.

When comparing the double-width sample layout in Table 2 and FIG. 7 with the original sample layout in Table 1 and FIG. 4, it can be observed that consecutive samples of the same primary color are now adjacent to each other in the vertical direction. This implies that accessing, for example, the blue (B) samples will only waste 50% of texture cache and memory bandwidth, compared to 75% in the original layout. In other words, the memory bandwidth and cache hit rate are effectively doubled. The advantages are gained not only in the Bayer pattern, but also other color filter arrays facing the same problem; i.e. at least in RGBE pattern, many variations of RGBW pattern, CYYM pattern and CYGM pattern.

One particular algorithm that stands to benefit from this invention is the Block Matching 3D (BM3D) denoising algorithm. BM3D is a denoising method based on the fact that an image has a locally sparse representation in transform domain. This sparsity is enhanced by grouping similar 2D image patches into 3D groups. The most computationally intensive step of BM3D is comparing each N×N block of G1 samples against the surrounding blocks of G1 samples. It has been observed that the speed-up provided by the embodiments is significant, even more than 30%, even at small values of the block size N.

It should be noted that the method according to the embodiments does not need to be used on algorithms that do not benefit from it; they can keep using the original image layout. Importantly, both kinds of algorithms, i.e. algorithms using the original image layout and algorithms using the adjusted image layout may coexist and operate on the exact same data, even at the same time, because the data itself is not changed or moved within the memory; it is merely the interpretation of the data that is changed.

A skilled man appreciates that any of the embodiments described above may be implemented as a combination with one or more of the other embodiments, unless there is explicitly or implicitly stated that certain embodiments are only alternatives to each other.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. The various devices may be or may comprise encoders, decoders and transcoders, packetizers and depacketizers, and transmitters and receivers.

Figure 8:
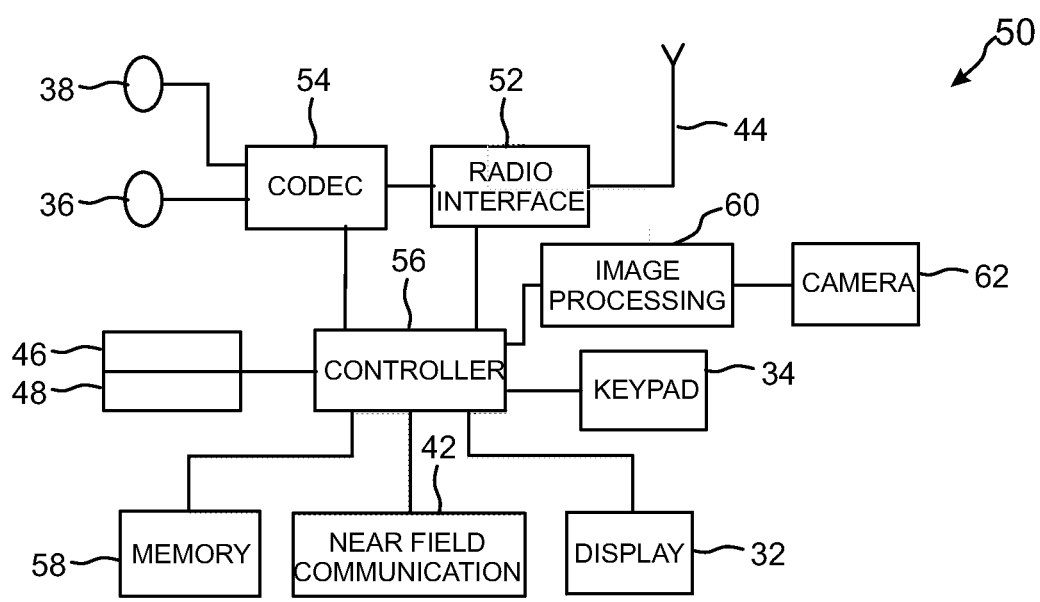
FIG. 8 shows a simplified example of an apparatus suitable to be used in the embodiments.

FIG. 8 shows a schematic block diagram of an exemplary apparatus or electronic device 50, which may incorporate necessary means for implementing the embodiments.

The apparatus 50 may be, for example, a mobile terminal or user equipment of a wireless communication system, a digital camera, a laptop computer etc. However, it would be appreciated that embodiments of the invention may be implemented within any electronic device or apparatus which may be functionally connected to a camera system.

The apparatus 50 may comprise a housing for incorporating and protecting the device and a display 32 in the form of any suitable display technology suitable to display an image or video. The display 32 may be a touch-sensitive display capable of being used as means for inputting information. The touch-sensitive display 32 may be implemented as a display element and a touch-sensitive element located above the display element.

The apparatus 50 may further comprise a keypad 34. The apparatus may comprise a microphone 36 or any suitable audio input which may be a digital or analogue signal input. The apparatus 50 may further comprise an audio output device, such as an earpiece 38, speaker, or an analogue audio or digital audio output connection. The apparatus 50 may also comprise a power source 40, such as a battery. The apparatus may further comprise a near field communication (NFC) connection 42 for short range communication to other devices, and/or any other suitable short range communication solution, such as a Bluetooth wireless connection, an infrared port or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to a codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system and/or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise or at least be functionally connected to a camera 62 capable of recording or detecting individual frames or images which are then passed to an image processing circuitry 60 or controller 56 for processing. Thus, the apparatus may also receive the image data from another device prior to transmission and/or storage. In further embodiments, the apparatus 50 may receive the image either wirelessly or by a wired connection for coding/decoding.

It is obvious that the present invention is not limited solely to the above-presented embodiments, but it can be modified within the scope of the appended claims.

The invention claimed is:

1. A method comprising:
   obtaining raw image data acquired by an image sensor to be applied in an image processing algorithm;
   adjusting, in a processor running the image processing algorithm, logical dimensions of the image such that logical width of the image is doubled and logical height of the image is halved;
   adjusting the image processing algorithm to take into account the adjusted logical dimensions of the image; and
   applying the image processing algorithm with the adjusted logical dimensions of the image.

2. The method according to claim 1, the method further comprising:
   adjusting the logical dimensions of the image by instructing the processor to interpret the logical width of the image as doubled and the logical height of the image as halved, while the size of the image in a memory remains unchanged.

3. The method according to claim 2, the method further comprising:
   instructing the processor to said interpretation by calling one or more functions in an application programming interface (API) used to control the processor.

4. The method according to claim 1, wherein
   the raw image data comprises green, red and blue samples arranged in a Bayer pattern.

5. The method according to claim 4, wherein
   one or more of the filters in the pattern is replaced by a filter arranged to pass light at least in non-visible light spectrum.

6. The method according to claim 1, wherein
   the processor is a graphics processing units (GPU) arranged to obtain the raw image data acquired by the image sensor.

7. An apparatus comprising at least one processor, memory including computer program code, the memory and the computer program code configured to, with the at least one processor, cause the apparatus to at least:
   obtain raw image data acquired by an image sensor to be applied in an image processing algorithm;
   adjust, in the processor running the image processing algorithm, logical dimensions of the image such that logical width of the image is doubled and logical height of the image is halved;
   adjust the image processing algorithm to take into account the adjusted logical dimensions of the image; and
   apply the image processing algorithm with the adjusted logical dimensions of the image.

8. The apparatus according to claim 7, comprising computer program code configured to, with the at least one processor, cause the apparatus further to:
   adjust the logical dimensions of the image by instructing the processor to interpret the logical width of the image as doubled and the logical height of the image as halved, while the size of the image in a memory remains unchanged.

9. The apparatus according to claim 8, comprising computer program code configured to, with the at least one processor, cause the apparatus further to:
   instruct the processor to said interpretation by calling one or more functions in an application programming interface (API) used to control the processor.

10. The apparatus according to claim 7, wherein
   the raw image data comprises green, red and blue samples arranged in a Bayer pattern.

11. The apparatus according to claim 10, wherein
   one or more of the filters in the pattern is replaced by a filter arranged to pass light at least in non-visible light spectrum.

12. The apparatus according to claim 7, wherein
   the processor is a graphics processing units (GPU) arranged to obtain the raw image data acquired by the image sensor.

13. A non-transitory computer readable storage medium stored with code thereon for use by an apparatus, which when executed by a processor, causes the apparatus to perform:
   obtaining raw image data acquired by an image sensor to be applied in an image processing algorithm;
   adjusting, in a processor running the image processing algorithm, logical dimensions of the image such that logical width of the image is doubled and logical height of the image is halved;
   adjusting the image processing algorithm to take into account the adjusted logical dimensions of the image; and
   applying the image processing algorithm with the adjusted logical dimensions of the image.

14. The non-transitory computer readable storage medium according to claim 13, causing the apparatus to further perform:
   adjusting the logical dimensions of the image by instructing the processor to interpret the logical width of the image as doubled and the logical height of the image as halved, while the size of the image in a memory remains unchanged.

15. The non-transitory computer readable storage medium according to claim 14, causing the apparatus to further perform:
   instructing the processor to said interpretation by calling one or more functions in an application programming interface (API) used to control the processor.

16. The non-transitory computer readable storage medium according to claim 13, wherein
   the raw image data comprises green, red and blue samples arranged in a Bayer pattern.

17. The non-transitory computer readable storage medium according to claim 16, wherein
   one or more of the filters in the pattern is replaced by a filter arranged to pass light at least in non-visible light spectrum.

18. The non-transitory computer readable storage medium according to claim 13, wherein
   the processor is a graphics processing units (GPU) arranged to obtain the raw image data acquired by the image sensor.

* * * * *